July 30, 1957 — W. E. BEILHARZ — 2,800,736

FISHHOOK VISE

Filed Aug. 29, 1955

INVENTOR
WILLIAM E. BEILHARZ
BY
*Albert J. Fihe*
ATTORNEY

United States Patent Office 2,800,736
Patented July 30, 1957

2,800,736

FISHHOOK VISE

William E. Beilharz, Los Angeles, Calif.

Application August 29, 1955, Serial No. 531,027

1 Claim. (Cl. 43—1)

This invention relates to an improved fish hook vise and has for one of its principal objects the provision of means whereby fish hooks of various sizes can be conveniently and safely held by the fingers of one hand for the application of a leader or line to the loop of the hook by the other hand.

One of the important objects of this invention is to provide a simple, inexpensive but highly efficient device whereby a fish hook can be securely and safely held for the purpose of tying the end of a line or leader thereto and without any danger of impaling one of the fingers or thumb of the operator upon the pointed end of the hook.

Another important object of the invention resides in the provision of a device of the class described which will be compact, light in weight, easily handled, and which furthermore can be readily constructed.

Other and further important objects of the invention will be apparent from the disclosures in the accompanying drawing and following specification.

The invention, in a preferred form, is illustrated in the drawings and hereinafter more fully described.

Figure 1:
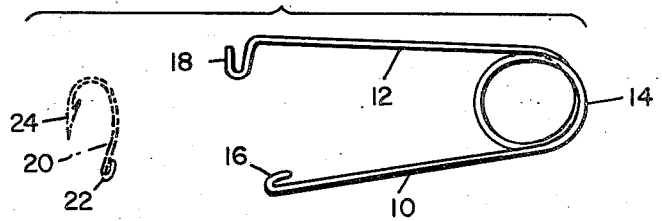
Figure 1 shows in an exploded view, the fish hook vise of this invention with a fish hook about to be applied thereto or held therein.

The reference numerals 10 and 12 indicate generally the two legs of the fish hook vise of this invention which essentially comprises a single piece of spring wire or the like, preferably bent into an O-shaped loop at one end, as shown at 14.

The leg or section 10 of the vise has its outermost end bent backwardly into a simple U-shape 16 and the outermost end of the leg 12 is first bent at right angles and then fashioned into a U-shaped hook element as shown at 18.

Figure 2:
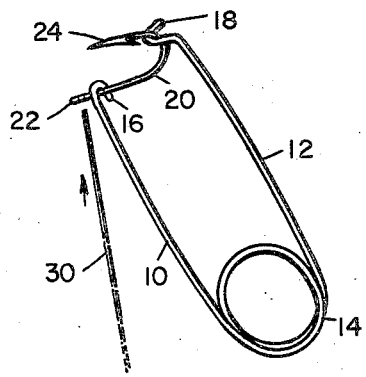
Figure 2 shows the vise with a fish hook actually held in position therein and with the end of a line or leader about to be applied to the loop of the hook.
Figure 4:
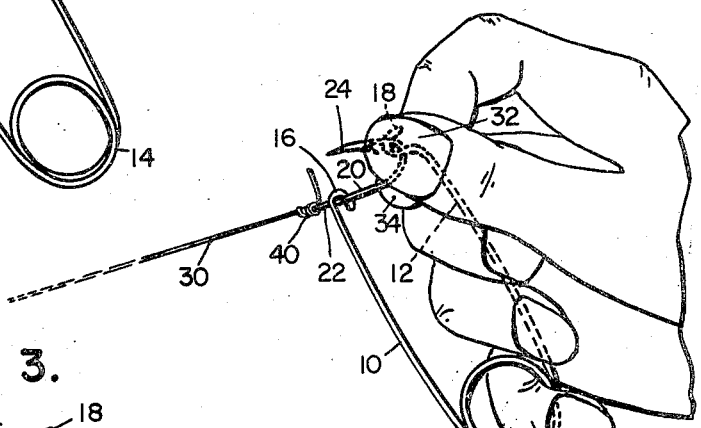
Figure 4 is a detail perspective view illustrating in more particularity the actual manner of holding the vise and hook in one hand while the knot in the leader or line is being drawn taut.

As best shown in Figures 1 and 2, a fish hook 20 is fitted into and held in desired position in the vise by placing the curved end of the hook into the U-shaped loop 18 and by placing the shank of the hook 20 in the U-shaped loop 16. The legs 10 and 12 are forced together for this purpose, and when released, the vise will assume the position shown in Figures 2, 3 and 4, whereby the hook is securely held with the loop 22 extending beyond the hook 16 of the vise and with the point and barb 24 maintained in such a position by the hook portion 18 of the vise that the assemblage can be readily grasped by the thumb and fingers of the operator as shown in Figure 4 and without any danger of injury from the point 24. The little finger 26 of the operator's hand is usually fitted through the loop 14, as this enables a better grasping of the whole vise.

Figure 3:
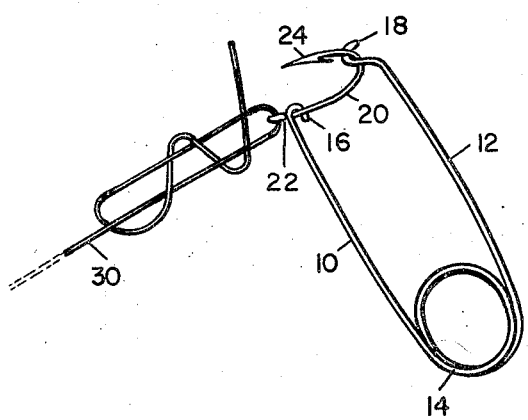
Figure 3 illustrates the device as it holds the hook when the leader or line is being fastened to the hook by knotting or otherwise.

It will be seen that the end of a leader or line 30 can then readily be passed through the loop 22 of the hook 20 for purpose of tying a knot and finally pulling the same up into a secure hook holding position, as best illustrated in Figures 3 and 4.

It will be noted that the grasping of the hook 20 behind the point and barb portion 24 by the thumb 32 and first finger 34 of the operator, together with the fact that the other fingers obtain a firm grasp on the vise, enables a tight knot 40 to be made at the juncture of the leader 30 and the loop 22 of the hook 20 by exerting sufficient pull on the line or leader 30.

It often happens that this pull on the line or leader to make a tight knot causes accidents in that if the hook 20 is carelessly held by the finger and thumb of the operator without the vise of this invention, severe and painful injury can result. Additionally, the hook is often rather small and a good grasp thereon cannot be obtained, with the result that a loose knot is formed with some eventual slippage and loss of the hook and possibly a fish.

Practically any size of hook can be handled with the vise of this invention, which easily accommodates itself to such variations while at the same time allowing of a suitable grasping of the hook and a resultant availability of the loop portion for threading of the line or leader therethrough. Additionally, the knot can be very easily made in one of many forms desired by the fisherman or operator and can be safely pulled into a secure position with practically no danger of injury or damage to the operator's fingers, thumbs or hand.

I am aware that many changes may be made and numerous details of construction varied throughout a wide range without departing from the principles of this invention, and I therefore do not propose limiting the patent granted hereon otherwise than as necessitated by the prior art.

I claim as my invention:

A fish hook vise comprising two integral leg portions and a looped end, means for resiliently holding said leg portions apart, a hook in the end of each leg portion, said hooks adapted to support a fish hook therein, the vise including an O-shaped loop at one end for providing resiliency, one of the hooks adapted to support the end of the U-shaped portion of the fish hook and the other hook adapted to contact the fish hook adjacent its looped end, the device being of a size to accommodate the three fingers of one hand of the operator, leaving the thumb and forefinger available for grasping the fish hook adjacent its point of support by the hook on the first mentioned leg, the O-shaped loop being of a size to accommodate the little finger of the hand of the operator and the legs of the vise being of a length sufficient to accommodate at least two fingers of the operator's hand between the loop at one end and the hooks at the other end.

References Cited in the file of this patent

UNITED STATES PATENTS

| | | |
|---|---|---|
| 1,208,671 | Severtsen et al. | Dec. 12, 1916 |
| 1,433,041 | Schwartz | Oct. 24, 1922 |
| 1,879,161 | Frambach et al. | Sept. 27, 1932 |
| 1,952,990 | Kirsch | Mar. 27, 1934 |
| 1,957,352 | Patricoski | May 1, 1934 |